Figure 1:
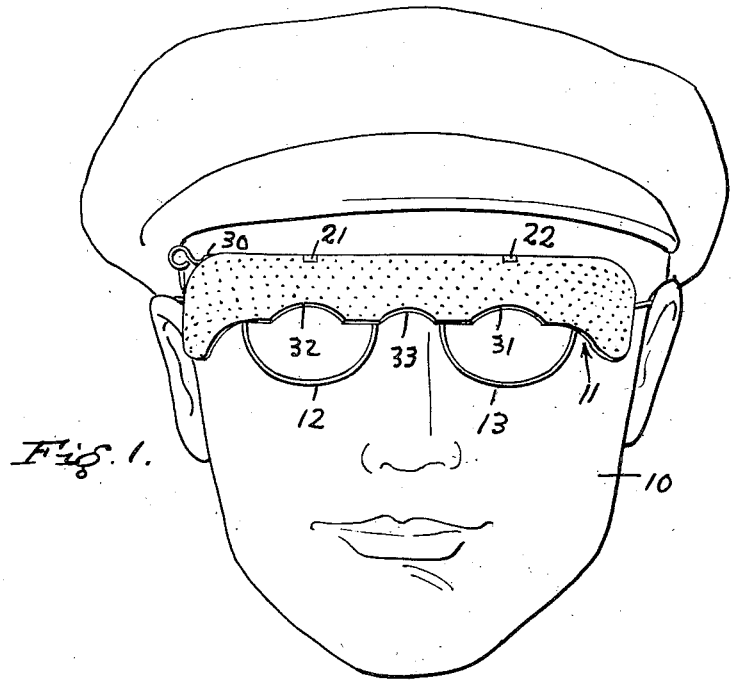

Aug. 12, 1930.   F. L. COSTENBADER   1,772,825
ANTIGLARE SPECTACLES
Filed April 5, 1929   2 Sheets-Sheet 1

Inventor
F. L. Costenbader
By Clarence A. O'Brien
Attorney

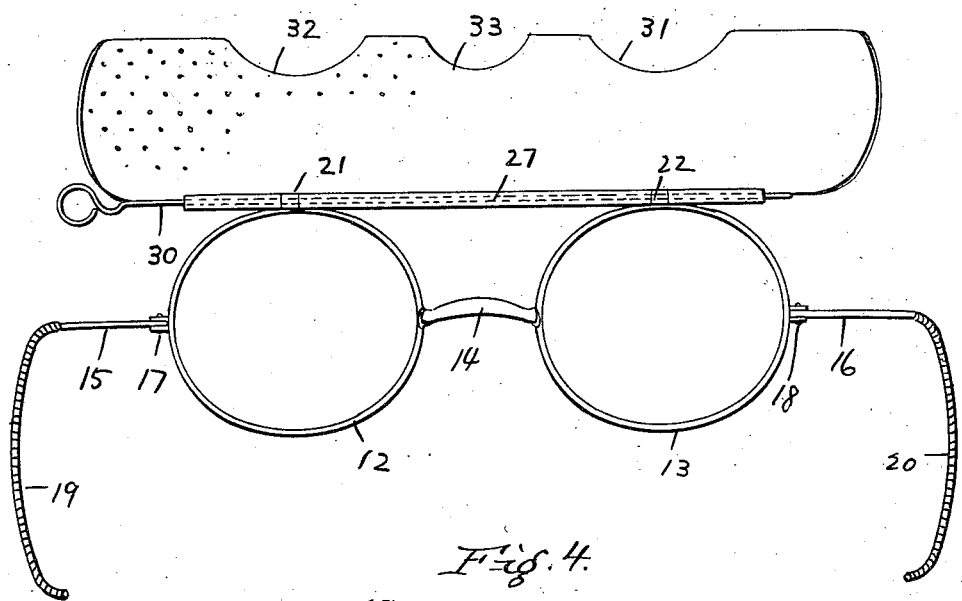
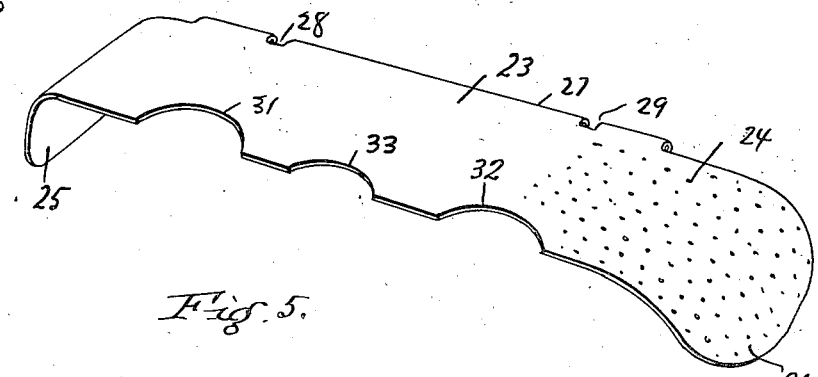
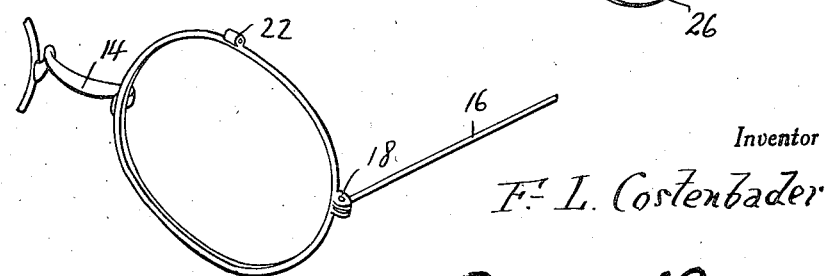
Inventor
F. L. Costenbader
By Clarence A. O'Brien
Attorney Patented Aug. 12, 1930

1,772,825

UNITED STATES PATENT OFFICE

FRANK L. COSTENBADER, OF RICHMOND, VIRGINIA

ANTIGLARE SPECTACLES

Application filed April 5, 1929. Serial No. 352,766.

This invention relates to anti-glare spectacles and the object of the invention is to provide for preventing the glare of approaching headlights or spotlights while driving an automobile regardless of the direction of the approaching rays of light.

A further object of the invention is to provide, a device of the character referred to, which is strong, compact and durable, highly efficient for its intended purpose, very simple in its operation, adapted to be carried on the person, without abnormal bulk, capable of application to any standard spectacle rim and comparatively inexpensive to manufacture and adjust.

With the foregoing and other objects in view, the invention consists of the novel construction, combination and arrangement of parts as will be hereinafter more specifically described and illustrated in the accompanying drawings, but it is to be understood that changes, variations and modifications may be resorted to without departing from the spirit or scope of the claim hereunto appended.

In the drawings wherein like reference characters denote corresponding parts throughout the several views—

Figure 2:
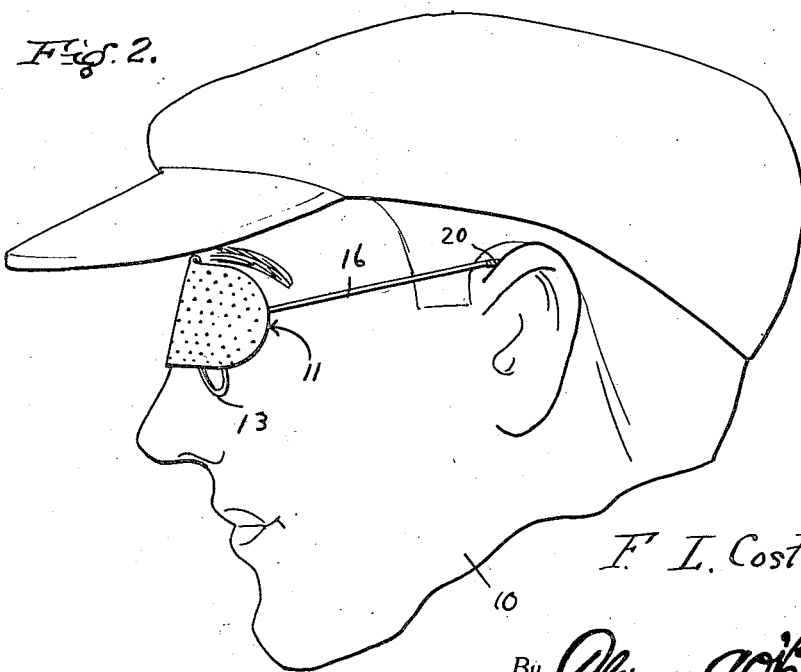

Figure 1 is a front elevation of a head of an operator illustrating an adaptation therewith of the device in question, Figure 2 is a side elevation of the head of an operator illustrating in side elevation the device in accordance with this invention, Figure 3 is a front elevation of the device detached from the person of the wearer, Figure 4 is a perspective view of the shield plate detached from the spectacle frame, Figure 5 is a broken away perspective view of the spectacles and illustrating the hinge member in accordance with this invention secured to the upper circumference of the spectacle rim.

Referring to the drawing in detail 10 illustrates the face of the wearer of the device in accordance with the invention indicated generally at 11 secured in position in operating form. A pair of spectacle rims 12, 13 are connected together by the conventional nose rest 14 and have a pair of temples 15, 16 pivoted to the outer circumference of the rims as at 17, 18 and the pivots are located at a point on the horizontal diameter through each rim. The ends of the temples are formed to provide flexibility as indicated at 19 and 20 where the temples are trained over the ears so as to provide for change of configuration to compensate for forward or rearward extension of the rim with respect to the eyes of the wearer.

A pair of sleeves 21, 22 are secured to the upper circumference of the rims 12, 13 respectively at points along the vertical diameters thereof.

A right elongated substantially rectangular shield plate 23 is provided with irregularly spaced staggered perforations 24 over its entire area. While the plate is described as rigid, it is within the contemplation of the invention to have the plate flexible, but there arises the objection attendant with transportation of flexible links when carried in the pocket of the wearer.

The plate 23 is of a plane contour merging at its ends with curved extensions 25, 26 which are disposed in angular relation to the plate 23 so as to cut off rays of light approaching at an angle to the plate 23. The upper longitudinal edges of the plate 23 are turned over upon themselves the major portion of the length of the ends to provide a roll 27 and the roll 27 is provided with a pair of notches 28, 29 extending inwardly into the plate beyond the roll so that the pair of sleeves 21, 22 may be seated in the notches flush with the roll. With the sleeves 21, 22 seated in the notches, an elongated pin is inserted in the tubular row 27 and trained through the sleeves 21, 22 on the rim of the spectacles.

The latter construction provides a rockable mounting for the plate 23 on the spectacle rims 12, 13 while at the same time the hinge 30 being slidably confined in the tubular roll sleeve provides a detachment of the plate for any purposes arising in the use thereof. The lower longitudinal edge of the plate 23 is provided with three concaved arcuate recesses 31, 32 and 33 the outer of which are larger than the intermediate recess 33.

The intermediate recess 33 is spaced equally distant from the outer recesses 31, 32 and is adapted for straddling the bridge of the nose, whereas the outer recesses 31, 32 are adapted for distribution in the line of vision of the operator. The outer recesses 31, 32 are spaced from the curved extension 25, 26.

In the application of the device in accordance with this invention, the spectacle rims are provided with flexible ear grips 19, 20 so as to enable the spectacle rim and the shield connected thereto to be placed in front of the glasses or lenses that may be necessary to be worn by the operator.

It is therefore within the contemplation of the present invention to merely utilize the spectacle rims as a support for the plate 23.

Having placed the rim upon the nose like any spectacle, the plate 23, being pivotally mounted on the rim may be adjusted to the proper angle over the line of vision whereupon the central cavity 33 is straddling the bridge of the nose and the outer concavities 31, 33 are disposed in the line of vision of the operator.

Upon the approach of an automobile or in a glaring sunlight, the head of the operator may be disposed at variant angles until the glaring light is in line with the perforated plate as the light passes through the perforated shield 23 the glare is eliminated but the location of the light is clearly ascertainable. Through the concavities 31 and 32 the driver's space is clearly located without causing annoyance to the eyesight of the operator as the light approaches the user it is almost instinct to keep lowering the head to cut off the glaring light as the car approaches nearer. When the car has passed, all glaring light has ceased the plate 23 may be turned upwardly entirely out of the vision of the operator as will be clearly understood by referring to Figure 3 of the drawing. With the side extensions 25, 26 angular rays of light are also cut out from the vision of the operator.

Having thus described my invention, what I claim as new is:

A pair of spectacles of the type characterized by metallic lens rims, a nose bridge securing the rims together on confronting sides, and ear templets for mounting the spectacles on the head of the wearer, upstanding sleeves on the upper portions of the lens rims, an elongated sheet of perforated material having a flat surface, the upper edge of the sheet formed with a rolled sleeve having recesses therein to receive the sleeves on the rims, a removable pin extending through the rolled sleeve and the sleeves on the rims, the lower edge of the sheet formed with three concaved recesses, the intermediate recess to rest on the bridge of the nose and the outer two recesses disposed forwardly of the eyes and the ends of the sheet curved rearwardly to form lateral shields to cut off rays of light approaching laterally of the line of vision.

In testimony whereof I affix my signature.

FRANK L. COSTENBADER.